United States Patent
Mente

Patent Number: 6,010,398
Date of Patent: Jan. 4, 2000

[54] SHACKLE DEVICE FOR HOLDING POULTRY CARCASSES

[75] Inventor: Mathias Mente, Lubeck, Germany

[73] Assignee: Nordischer Maschinenbau Rud. Baader GmbH +Co. KG, Lübeck, Germany

[21] Appl. No.: 09/092,502

[22] Filed: Jun. 5, 1998

[30] Foreign Application Priority Data

Jun. 5, 1997 [DE] Germany .......................... 197 23 571

[51] Int. Cl.⁷ .................................................. A22C 21/00
[52] U.S. Cl. ........................................... 452/188; 452/179
[58] Field of Search .................................. 452/188, 187, 452/177, 179

[56] References Cited

U.S. PATENT DOCUMENTS

| | | | |
|---|---|---|---|
| 3,563,363 | 2/1971 | Harben | 452/177 |
| 3,781,946 | 1/1974 | Altenpohl | 454/188 |
| 5,037,351 | 8/1991 | Van Den Nieuwelaar et al. | 452/188 |
| 5,188,559 | 2/1993 | Hazenbroek . | |
| 5,366,406 | 11/1994 | Hobbel et al. | 452/179 |
| 5,487,700 | 1/1996 | Dillard | 452/188 |
| 5,490,812 | 2/1996 | Schaarschmidt . | |
| 5,494,479 | 2/1996 | Lindert et al. . | |
| 5,505,657 | 4/1996 | Janssen et al. | 452/188 |

FOREIGN PATENT DOCUMENTS 0 444 782 A1  9/1991  European Pat. Off. .

*Primary Examiner*—Willis Little
*Attorney, Agent, or Firm*—Knobbe, Martens, Olson & Bear, LLP

[57] ABSTRACT

In a poultry-processing machine a suspension conveyor is provided, with the aid of which poultry carcasses are guided individually through processing stations. The poultry carcasses are held for this purpose on shackles fastened to the suspension conveyor, which accommodate the poultry carcasses suspended by the legs. For the purpose of carrying out processing procedures in various levels of the carcass, the shackles are arranged on the suspension conveyor so as to rotate about a shackle shaft. The rotational mechanism comprises a plate element that is equipped with tappets in the form of pins projecting from its top and bottom sides, in the path of which a pair of stationary cam elements in an oppositely mirror-symmetrical arrangement impinge in such a manner that one tappet respectively from the top and the bottom side is in contact during the rotational process with the end-face cams of the cam elements. The rotational mechanism permits a turning of the shackles under forced guidance and holding the achieved rotational position in place.

20 Claims, 2 Drawing Sheets

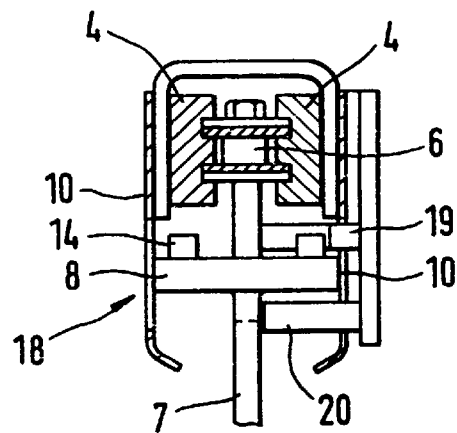
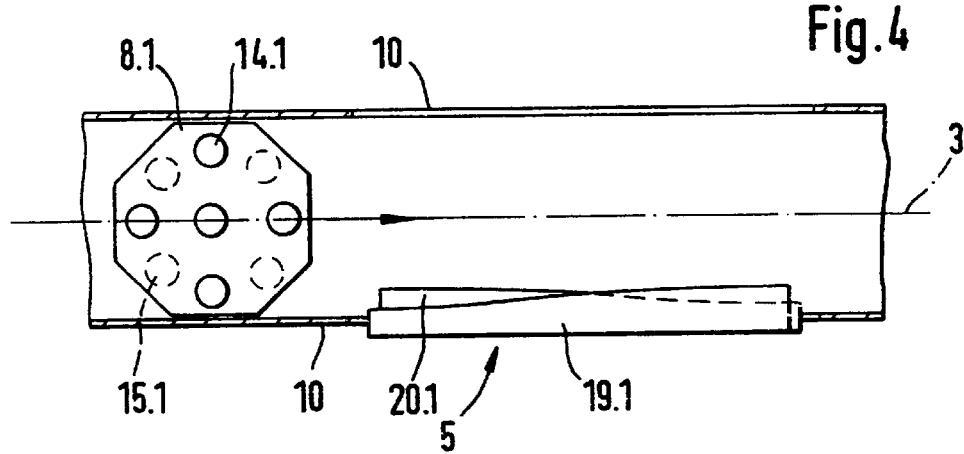
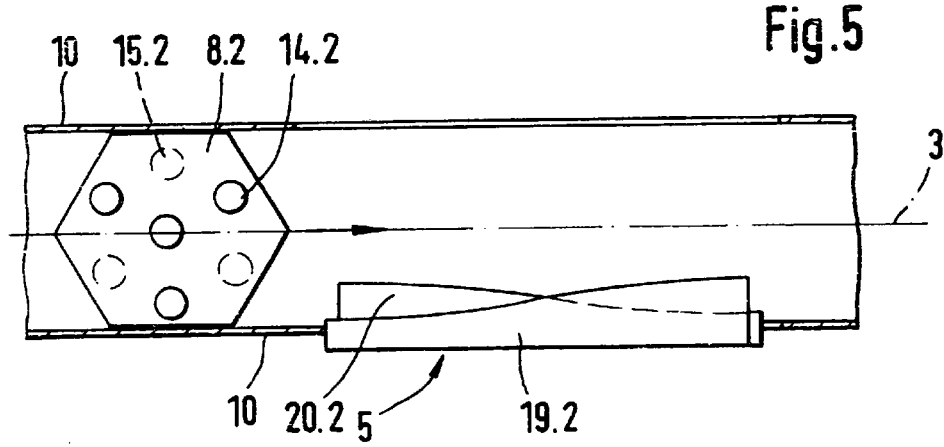

SHACKLE DEVICE FOR HOLDING POULTRY CARCASSES

FIELD OF THE INVENTION

The invention relates to a device for holding poultry carcasses for the purpose of processing them, comprising a driven suspension conveyor for conveying the poultry carcasses along a predetermined conveyance path, with a number of shackles suspended from the suspension conveyor and arranged so as to be able to rotate about an essentially vertical shackle shaft, with means for holding the poultry carcasses and further comprising control means arranged stationary along the conveyance path which enter into connection with engagement means on the shackle shaft of each shackle, bringing about a rotational motion in the process.

BACKGROUND OF THE INVENTION

Shackle devices are employed in automatic poultry processing machines in which poultry carcasses are guided individually through processing stations. For this purpose, each poultry carcass is suspended by the ankles in the shackle, so that the poultry carcasses are held suspended with the legs pointing upwards. Rotating shackles find application particularly in the cutting up of the poultry carcass in order to produce pieces appropriate for consumption, such as halves, legs, wings, etc., since processing procedures can be carried out in this way on different levels of the carcass starting from the conveyance motion.

From EP 0 444 782 A1, a shackle device is known in the which the shackle can rotate. The shackle fastened to a conveyor is equipped for this purpose with a cam element at a vertical axis. The cam element gets into connection with a stationary cam element in the course of the conveyance and causes the shackle to rotate 90°. Both the original position and the 90°-rotated position are locked in place by a ball catch.

It is disadvantageous in this device that the rotating motion does not take place without jerks and collisions, which at the desired processing speeds lead to uncontrolled swinging and turning motions that impair the processing. The cause of this is the high initial rotational acceleration of the shackles, as well as the torque necessary to overcome the resistance of the rotary catch.

SUMMARY OF THE INVENTION

The problem of the invention is to specify a shackle device with a rotating shackle whose rotation can be carried out smoothly and precisely even at high conveyance velocity. At the same time, it should be made possible to provide the rotational motion of the shackle arbitrarily in both the clockwise and the counterclockwise direction and to hold the respective rotational position achieved securely in place. In addition, the shackle device should be capable of being manufactured at relatively low expense and of being easily integrated into existing poultry processing lines.

This problem is solved in a shackle device of the type mentioned initially in that the engagement means comprise a plate element arranged as a collar on the shackle shaft with tappets, which project on a circle concentric with the shackle shaft at an equal division and in an equal number from the bottom and from the top sides of the plate element, their arrangement being chosen such that the tappets of the top side are arranged offset by half a division from those of the bottom side, and in that the control means comprise a pair of congruent cam elements, each with an end-face cam, which are arranged at the sides of the conveyance path and oppositely mirror-symmetrical directly above or below the path of the plate element, and each enter into contact essentially simultaneously with a tappet of the top side and the next successive tappet of the bottom side in the rotational direction of the shackle.

Such a design has a variety of advantages. Thus, it is possible to initiate and finish the rotational motion of the shackle with a slight rotational acceleration and thereby bring about a forced guidance which excludes the danger of over-rotation. The use of oppositely symmetrical cam elements makes it possible for them to be manufactured from a single, preferably rectangular, plate by a single separation cut, which determines the profile of the end-face cams of each of the associated cam elements.

In order to permit low-wear operation, the tappets coming into contact with the cam elements can be constructed as pins with a rolling sleeve, so that the contact between cam element and tappet takes place as a rolling motion.

For fixation of the respective angular position of the shackle that has been achieved, the plate element is constructed as a regular polygon with an even number of sides that is guided upstream and downstream of the pivoting stations along opposing peripheral surfaces between parallel guide surfaces. The functional prerequisite in this regard is that the number of peripheral surfaces matches the total number of tappets of a plate element and each tappet is placed on the line of symmetry of a multi-vertex segment. In concrete terms, this means that, for instance, a plate element with four tappets is constructed as a square, where two opposing, i.e., 180°-offset, tappets are provided on the top side and, offset by 90°, on the bottom side of the plate element.

There is thus advantageously provided a method and device for holding at least portions of animal carcasses for the purpose of processing the carcass. The apparatus includes a suspension conveyor traveling along a predetermined conveyance path and having a plurality of shackles connected to the conveyor through a shaft that is mounted to rotate about a longitudinal axis of the shaft. The shackles have a receptacle configured to engage the animal carcasses. A first cam follower and a first cam surface are located along the conveyance path. The cam follower and cam surface are positioned relative to each other so the cam follower engages the cam surface during at least a portion of the travel along the conveyance path. One of the cam follower or cam surface is connected to the shaft and aligned so that the shaft rotates as the follower moves along the cam surface. Advantageously the cam follower has an axis that is substantially parallel to the rotational axis of the shaft and is connected to the shaft, with the cam surface being generally orthogonal to the rotational axis so that movement of the cam follower along the cam surface rotates the shaft and shackle.

Advantageously, the device has a second cam follower and a second cam surface located along the conveyance path, with the second cam follower and second cam surface positioned relative to each other so the second cam follower engages the second cam surface during at least a portion of the travel along the conveyance path. One of the second cam follower or second cam surface is connected to the shaft and aligned so that the rotation of the shaft is limited by the second follower moving along the second cam surface. This construction and resulting motion is advantageously achieved by placing the second cam surface in a plane generally parallel to a plane containing the first cam follower surface, and making the second cam follower surface with a shape opposite to the shape of the first cam follower surface so that one of the cam followers and cam follower surfaces causes the shaft to rotate and the other cam follower and cam follower surface limits rotation of the shaft.

The invention also includes a method of processing carcasses according to the above described steps and apparatus, including the steps of conveying a poultry carcass secured by a shackle along the conveyance path in a first orientation of the poultry carcass. A first one of the tappets is guided along a surface of a first one of the cam elements to initiate rotation of the poultry carcass from the first orientation into a second orientation. A second one of the tappets is guided along a surface of a second one of the cam elements to inhibit that rotation beyond a predetermined amount. The limitation of this motion is achieved by making the surfaces have opposite slopes so that as one cam is ramping up its cam surface the other cam is ramping down its cam surface. Advantageously, the first one and the second one of the tappets are each guided along surfaces having the shape of a portion of a sinusoidal line.

BRIEF DESCRIPTION OF THE DRAWINGS

The foregoing features and other features of the present invention will now be described with reference to the drawings of a preferred embodiment of a shackle device. The illustrated embodiment is intended to illustrate, but not to limit the invention. The drawings include the following figures:

FIG. 3 shows a cross section through the machine according to FIG. 1 in the area of a shackle turning station;

FIG. 4 shows an alternative embodiment of the turning station provided for different angles of rotation; and FIG. 5 shows a further alternative embodiment of the turning station provided for different angles of rotation.

DETAILED DESCRIPTION OF THE PREFERRED EMBODIMENT

Figure 1:
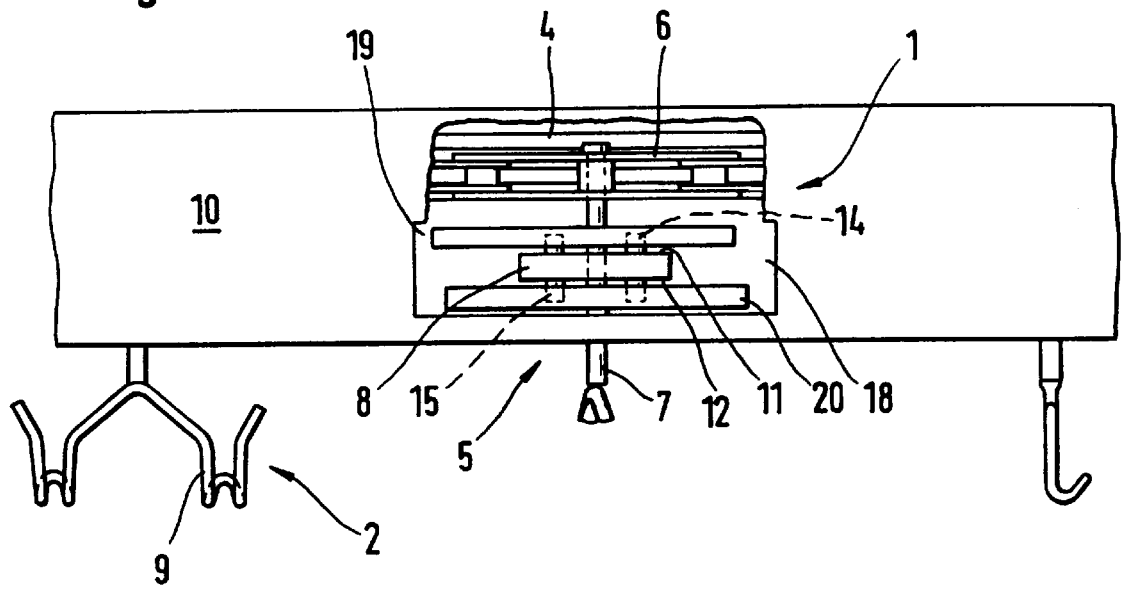
FIG. 1 shows a partial side view of a poultry processing machine.

FIG. 1 shows a cut-out from an ordinary poultry-processing machine installed in a chassis, with a suspension conveyor 1 equipped with shackle devices 2 that follow a conveyance path 3 defined by idle wheels, not shown, and guidance means 4 shown only partially, in the course of which path turning stations 5 for rotating the shackle devices 2 are provided.

The suspension conveyor 1 comprises an endless flat link chain 6, which, upon being driven circulates in the proper manner in a horizontal plane in which the shackle devices 2 are anchored. Each shackle devices 2 has a shackle-shaft 7 that is freely seated to rotate in the flat link chain 6 and equipped at its lower end with a shackle 9 for holding the poultry carcass by the legs. Fastened to the shackle shaft 7 is a collar-like plate element 8, of square shape according to FIG. 2, and guided between parallel guide surfaces 10 stationary with respect to the chassis which extend along the conveyance path 3. The plate element 8 is equipped according to FIG. 2 with two pins 14 and 15 projecting from the top and bottom sides 11 and 12, respectively, and acting as tappets 13. The pins are each arranged on a circular arc 16 concentric with the shackle shaft 7 and a line of symmetry 17 that runs between mutually opposing peripheral sides and parallel to the latter. At the same time, the pins 14 and 15 on the top and bottom sides 11 and 12, respectively, are mutually offset by 90°.

A turning station 5 is characterized by an interruption 18 of the guide surfaces 10, in which two respective cam elements 19 and 20 with end-face cams 21 are fastened stationary with respect to the chassis. The end-face cams are identical and in the third and fourth quadrants follow, for instance, the profile of a sinusoidal line whose amplitude corresponds to the radius of the circular arc 16. The cam elements 19 and 20 are oppositely mirror-symmetrical and are arranged one above the other with a spacing and offset about 15 mm longitudinally, so that the cam element 19 extends in the path of the pins 14 and the cam element 20 in the path of the pins 15. The cam elements 19 and 20 here are installed such that their end-face cams 21 project into the path of the pins 14 and 15. In their approach areas the end-face cams 21 have inclined cams 22.

Figure 2:
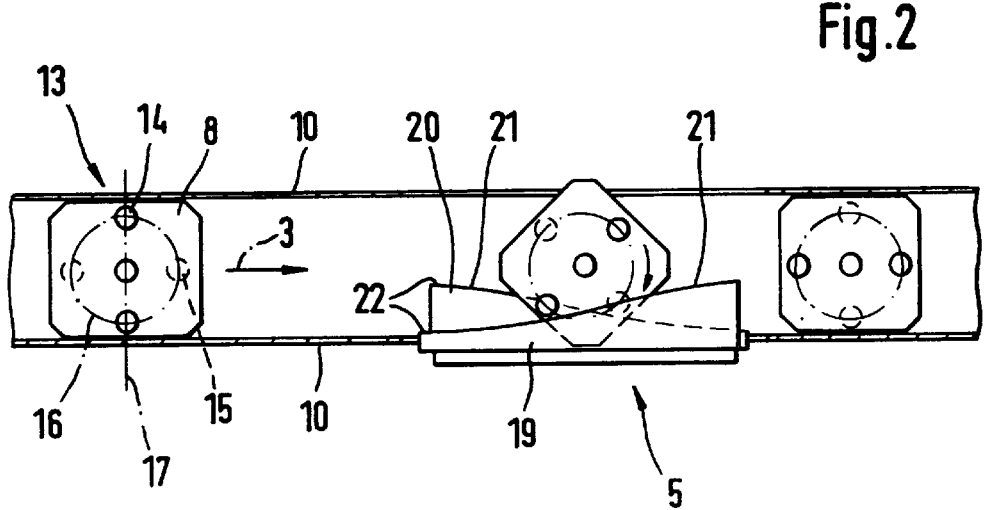
FIG. 2 shows a plan view onto the machine according to FIG. 1 in the area of the shackle turning station.

The functional sequence is described below on the basis of FIGS. 1 and 2: By way of example, the shackle device 2 coming from the loading station of a poultry-processing line is held in a rotated position in which the shackle 9 is guided such that the holders accommodating the legs of the poultry carcass are arranged one after the other in the direction of conveyance. The guidance surfaces 10, between which the plate element 8 joined to the shackle shaft 7 is guided, ensure the maintenance of this position. In the illustrated example, the pins 14 on the top side 11 of the plate element 8 are on a line perpendicular to the conveyance direction, and, consequently, the pins 15 on the bottom side 12 are arranged on a line along the conveyance direction. Thus aligned, the shackle device 2 reaches a first turning station 5, after, for instance, a transverse processing step in the form of a preliminary front half cut has taken place. In the aforementioned constellation, the upper curve element 19 is arranged such that the pin 14 pointing outwards contacts the end-face cam 21 on the entry side and begins to slide along it. Immediately thereafter the lower cam element comes into contact with the pin 15, so that the lower cam element 19 acts as a guidance cam and the upper cam element 20 as a contact cam, that is to say, a forced guidance takes place, in which two pins are respectively engaged. In this manner, a shock-free 90° rotation of the shackle 9 takes place, the acceleration profile of which can be individually specified by the selection of the cam profile. The complete rotational step can be followed in subsequent additional turning stations, not shown, additional rotational steps may follow which can continue in the clockwise direction or run in reverse against it, depending on the arrangement of the cam elements 19 and 20 to the right or left of the conveyance path 3.

With the embodiments of FIGS. 4 and 5, rotational steps of 45° and 60°, respectively, can be achieved according to the same functional principle. The respective associated cam elements 19.1, 20.1 and 19.2, 20.2, respectively, are constructed such that their end-face cams 21.1 and 21.2, respectively, follow the aforementioned sinusoidal line, its amplitudes then respectively corresponding to 0.293 and 0.5 times the radius of the circular arc 16. In association therewith, the corresponding plate elements 8.1 and 8.2 have the shape of a regular octagon or hexagon with four and four or three and three pins 14.1 and 15.1 or 14.2 and 15.2, respectively, in an arrangement as described above in connection with plate element 8.

Due to the forced guidance during the turning process, each turning station 15 can be assigned to a processing tool such that the turning of the shackle 9 takes place during the processing of the poultry carcass. It is possible to shape the profile of the rotational motion essentially arbitrarily by appropriate selection of the profile of the end-face cams 21 of the cam elements 19 and 20.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A device for holding poultry carcass for the purpose of processing them, comprising:

a suspension conveyor, the suspension conveyor configured to convey the poultry carcasses along a predetermined conveyance path;

a number of shackles, the shackles suspend from the suspension conveyor and are arranged so as to be able to rotate about an essentially vertical shackle shaft, each shackle having at least one receptacle configured to engage said poultry carcasses;

a number of control elements, the control elements arranged stationary along the conveyance path which enter into connection with the receptacles on each shackle bringing about a rotational motion in the process;

a number of plate elements, each plate element positioned on one of the receptacles as a collar on the shackle shaft with tappets, the tappets projecting on a circle concentric with the shackle shaft at an equal division and in an equal number from the bottom side and the top side of the plate element, the tappets having an arrangement which is chosen such that the tappets of the top side are arranged offset by half a division from those of the bottom side; and cam elements, the cam elements associated with the control elements, the cam elements each having an end-face cam and being arranged at the sides of the conveyance path and oppositely mirror-symmetrical directly adjacent to the path of the plate element and each enter into contact essentially simultaneously with a tappet of the top side and the next successive tappet of the bottom side in the rotational direction of the shackle.

2. The device of claim 1, wherein the tappets are formed by pins.

3. The device of claim 1, wherein each pin serves as the shaft for a rolling sleeve.

4. The device of claim 1, wherein the plate element has the contour of a regular polygon with an even number of sides, the number of peripheral surfaces corresponding to the total number of tappets of a plate element and each tappet being placed on the line of symmetry of a multi-vertex segment.

5. The device of claim 3, wherein the plate elements of the shackles are guided between stationary guide surfaces running on both sides of the conveyance path and mutually parallel.

6. The device of claim 4, wherein the plate elements of the shackles are guided between stationary guide surfaces running on both sides of the conveyance path and mutually parallel.

7. The device of claim 4, wherein the tappets are arranged to allow rotation of 90 degrees.

8. The device of claim 4, wherein the tappets are arranged to allow a rotation of 45 degrees.

9. The device of claim 4, wherein the tappets are arranged to allow a rotation of 60 degrees.

10. The device of claim 6, wherein the guide surfaces have interruptions in which the control elements are arranged.

11. A device for holding at least portions of animal carcasses for the purpose of processing them, comprising:

a suspension conveyor traveling along a predetermined conveyance path and having a plurality of shackles connected to the conveyor through a shaft that is mounted to rotate about a longitudinal axis of the shaft, the shackles having a receptacle configured to engage the animal carcasses; and a first cam follower and a first cam surface located along the conveyance path, the cam follower and cam surface being positioned relative to each other so the cam follower engages the cam surface during at least a portion of the travel along the conveyance path, one of the cam follower or cam surface being connected to the shaft and aligned so that the shaft rotates as the follower moves along the cam surface, the cam follower and cam surface being located and configured relative to each other to contact at an inclined angle sufficient to avoid high rotational acceleration of the shaft resulting from the initial contact of the cam follower and cam surface.

12. A device as defined in claim 11, wherein the cam follower has an axis that is substantially parallel to the rotational axis of the shaft, the cam follower being connected to the shaft and the cam surface being generally orthogonal to the rotational axis so that movement of the cam follower along the cam surface rotates the shaft and shackle under gradually increasing controlled guidance of the cam surface.

13. A device as defined in claim 11, further comprising a second cam follower and a second cam surface located along the conveyance path, the second cam follower and second cam surface being positioned relative to each other so the second cam follower engages the second cam surface during at least a portion of the travel along the conveyance path, one of the second cam follower or second cam surface being connected to the shaft and aligned so that the rotation of the shaft is limited by the second follower moving along the second cam surface.

14. A device as defined in claim 11, further comprising a second cam follower and a second cam surface located along the conveyance path, the second cam follower and second cam surface being positioned relative to each other so the second cam follower engages the second cam surface during at least a portion of the travel along the conveyance path, one of the second cam follower or second cam surface being connected to the shaft, the cam surfaces being formed in planes that are substantially parallel to each other and having substantially identical, but opposing shapes.

15. A device as defined in claim 11, wherein the first cam follower is mounted to rotate about the axis and the first cam follower surface is located along the conveyance path, and further comprising a second cam follower mounted to rotate about the axis and a second cam surface located along the conveyance path and in a plane generally parallel to a plane containing the first cam follower surface, the second cam follower surface having a shape opposite to the shape of the first cam follower surface wherein one of the cam followers and cam follower surfaces causes the shaft to rotate and the other cam follower and cam follower surface limits rotation of the shaft.

16. A method of transporting poultry carcasses along a conveyance path defined by a suspension conveyor having a number of shackles, the conveyor further comprising a number of control elements, a number of plate elements comprising tappets, the tappets projecting on a circle concentric with a shackle shaft, and cam elements, comprising the steps of:

conveying a poultry carcass secured by a shackle along the conveyance path in a first orientation of the poultry carcass;

guiding a first one of the tappets along a surface of a first one of the cam elements to initiate rotation of the poultry carcass from the first orientation into a second orientation; and guiding a second one of the tappets along a surface of a second one of the cam elements to inhibit said rotation, wherein the surfaces have opposite slopes.

17. The method of claim 16, wherein the first one and the second one of the tappets are each guided along surfaces having the shape of a portion of a sinusoidal line.

18. A device for holding at least portions of animal carcasses for the purpose of processing them, comprising:

a suspension conveyor traveling along a predetermined conveyance path and having a plurality of shackles connected to the conveyor through a shaft that is mounted to rotate about a longitudinal axis of the shaft, the shackles having a receptacle configured to engage the animal carcasses;

a first cam follower and a first cam surface located along the conveyance path, the cam follower and cam surface being positioned relative to each other so the cam follower engages the cam surface during at least a portion of the travel along the conveyance path, sufficient to avid high rotated acceleration of the shaft one of the cam follower or cam surface being connected to the shaft and aligned so that the shaft rotates as the follower moves along the cam surface, and a second cam follower and a second cam surface located along the conveyance path, the second cam follower and second cam surface being positioned relative to each other so the second cam follower engages the second cam surface during at least a portion of the travel along the conveyance path, one of the second cam follower or second cam surface being connected to the shaft and aligned so that the rotation of the shaft is limited by the second follower moving along the second cam surface.

19. A device for holding at least portions of animal carcasses for the purpose of processing them, comprising:

a suspension conveyor traveling along a predetermined conveyance path and having a plurality of shackles connected to the conveyor through a shaft that is mounted to rotate about a longitudinal axis of the shaft, the shackles having a receptacle configured to engage the animal carcasses;

a first cam follower and a first cam surface located along the conveyance path, the cam follower and cam surface being positioned relative to each other so the cam follower engages the cam surface during at least a portion of the travel along the conveyance path, one of the cam follower or cam surface being connected to the shaft and aligned so that the shaft rotates as the follower moves along the cam surface; and a second cam follower and a second cam surface located along the conveyance path, the second cam follower and second cam surface being positioned relative to each other so the second cam follower engages the second cam surface during at least a portion of the travel along the conveyance path, one of the second cam follower or second cam surface being connected to the shaft, the cam surfaces being formed in planes that are substantially parallel to each other and having substantially identical, but opposing shapes.

20. A device for holding at least portions of animal carcasses for the purpose of processing them, comprising:

a suspension conveyor traveling along a predetermined conveyance path and having a plurality of shackles connected to the conveyor through a shaft that is mounted to rotate about a longitudinal axis of the shaft, the shackles having a receptacle configured to engage the animal carcasses;

a first cam follower and a first cam surface located along the conveyance path, the cam follower and cam surface being positioned relative to each other so the cam follower engages the cam surface during at least a portion of the travel along the conveyance path, the first cam follower being mounted to rotate about the longitudinal axis; and a second cam follower mounted to rotate about the longitudinal axis and a second cam surface located along the conveyance path and in a plane generally parallel to a plane containing the first cam surface, the second cam surface having a shape opposite to the shape of the first cam surface wherein one of the cam followers and cam surfaces causes the shaft to rotate and the other cam surface limits rotation of the shaft.

* * * * *

UNITED STATES PATENT AND TRADEMARK OFFICE
CERTIFICATE OF CORRECTION

PATENT NO. : 6,010,398
DATED : January 4, 2000
INVENTOR(S) : Mathias Mente

It is certified that error appears in the above-identified patent and that said Letters Patent is hereby corrected as shown below:

<u>Column 7,</u>
Lines 34 and 35, please change "path, sufficient to avid high rotated acceleration of the shaft one" to -- path, one --.

Signed and Sealed this

Thirteenth Day of August, 2002

*Attest:*

*Attesting Officer*

JAMES E. ROGAN
*Director of the United States Patent and Trademark Office*